United States Patent [19]

Wilson et al.

[11] 4,282,703

[45] Aug. 11, 1981

[54] FEEDER HOUSE FOR A CROP HARVESTER

[75] Inventors: John E. Wilson, Colona City, Ill.; Edward J. Hengen, Bettendorf City, Iowa

[73] Assignee: Deere & Company, Moline, Ill.

[21] Appl. No.: 102,090

[22] Filed: Dec. 10, 1979

[51] Int. Cl.³ .......................... A01F 7/06; A01F 12/00
[52] U.S. Cl. ................................. 56/14.6; 130/27 T; 130/27 AB
[58] Field of Search .................... 56/14.5, 14.6, 126, 56/127, 128, 129; 130/27 AB, 27 T, 27 H

[56] References Cited

U.S. PATENT DOCUMENTS

| | | | |
|---|---|---|---|
| 2,455,906 | 12/1948 | Ronning et al. | 56/364 |
| 2,470,704 | 5/1949 | Korsmo et al. | 56/14.6 |
| 2,946,170 | 7/1960 | Anderson | 56/16.4 |
| 3,233,395 | 2/1966 | Dahl et al. | 56/14.5 |
| 3,412,535 | 11/1968 | Drummond | 56/14.4 |
| 3,468,112 | 9/1969 | Landgrebe | 56/364 |
| 3,521,433 | 7/1970 | Wright et al. | 56/14.6 |
| 3,545,185 | 12/1963 | Whitfield et al. | 56/14.6 |
| 3,769,988 | 11/1973 | Burenga | 136/30 H |
| 3,775,953 | 12/1973 | Poutsma | 56/126 |
| 3,913,303 | 10/1975 | Blake et al. | 56/14.6 |
| 4,087,953 | 5/1978 | Wilson et al. | 56/14.6 |
| 4,170,235 | 10/1979 | Ashton et al. | 56/14.6 |

FOREIGN PATENT DOCUMENTS

| | | | |
|---|---|---|---|
| 989114 | 4/1965 | United Kingdom | 56/14.6 |
| 547186 | 4/1977 | U.S.S.R. | 56/14.6 |

Primary Examiner—Paul J. Hirsch

[57] ABSTRACT

The feeder house of a self-propelled combine harvester carries a front-mounted gatherer which delivers crop material to a forward inlet of the feeder house which is pivotally supported by the combine separator body, and delivers crop material to an inlet of the separator. A pair of side-by-side, contra-rotating auger conveyors deliver crop material directly to the separator rotor in a relatively concentrated high-speed stream. Convergence and concentration of the harvested crop material begun by a grain platform auger is continued by a pair of transverse beaters, each including helical conveying elements, arranged in tandem ahead of and partially above the dual auger conveyors. A forward beater close to the feeder house inlet receives material directly from the platform auger and conveys it rearwardly over a floor somewhat elevated with respect to the auger conveyors and transfers it to a second beater above the forward end of the dual augers which directs it downwards into the auger conveyors. A hold-down rod, generally parallel to the axis of the conveyor augers, is provided above each auger to assist in controlling the transfer of crop material from the rear beater to the augers. Portions of the feeder house also playing an important part in the control and conveying of crop material include the floor beneath the first beater, converging ramp-like surfaces in the feeder house side walls downstream of the rear beater, and the particular spacing from the auger conveyors of the feeder housing wall portions surrounding them.

28 Claims, 7 Drawing Figures

FEEDER HOUSE FOR A CROP HARVESTER

BACKGROUND OF THE INVENTION

This invention relates to a feeding system for a crop harvester and, in particular, to means for converging and concentrating crop material as it is conveyed from a gathering or harvesting means to a crop processing means of the harvester.

It is the general nature of mobile crop harvesters which includes crop processing means, to transfer crop material from the field to the crop processing means as the harvester advances by means of a gathering and conveying combination often called a header. Typically, and especially in combine harvesters for handling grain and the like, where the crop processing means is commonly referred to as a separator, the transverse span or width of the gatherer is much greater than that of the separator (and particularly the inlet to the separator) and the gatherer is required to converge crop material to the inlet of a feeder house for conveying it from the gatherer to the inlet of the separator. Typically, the feeder house is parallel sided and its conveying elements move material linearly from the gatherer to the separator without further convergence. Lateral convergence of material for delivery to the separator, therefore, is done essentially in one stage and all of it by the gatherer. Such systems, involving sudden concentration and abrupt change of direction of material at the entrance to the feeder house (if the full width of the parallel-sided feeder house conveyor is to be used), are inherently inefficient, but because of their relative simplicity, their inefficiencies have been tolerated. However, with the desire for ever greater harvester productivity, achieved through wider gatherers and/or higher forward speeds and requiring convergence and concentration of material at ever greater rates, improved crop material handling at the entrance to and within the feeder house is needed. The need is particularly great, for example, in a combine harvester using a fore-and-aft disposed axial flow rotary separator which typically has a high specific capacity in terms of separator overall dimensions and may preferably be fed with a relatively narrow concentrated stream of crop material.

In one such harvester, as disclosed in U.S. Pat. No. 4,170,235, Ashton et al, the approach to high capacity is made by using a relatively wide feeder house and feeder house conveyor and interposing between the conveyor and separator inlet a relatively large diameter transverse converging conveyor with a central beater portion. However, this arrangement only postpones until it can be postponed no longer completion of the simple lateral convergence of material begun by the lateral or transverse conveyor of a gatherer such as the platform auger of the grain platform disclosed by Ashton. By postponing the convergence and concentration of material, an inconveniently bulky feeder house is still required.

It is also known, as disclosed in U.S. Pat. No. 4,087,953, Wilson et al (sharing a common assignee with the present application), to improve the efficiency of transfer of crop material from a gatherer to a feeder house conveyor system of high specific capacity by using a simple transversely oriented, paddle-type beater working in tandem with the central discharge portion of the gatherer transverse conveyor auger. When an efficient high specific capacity feeder house conveyor, such as the dual auger arrangement of Wilson et al, is used, it is possible to provide the substantial increases in material handling capacity now being demanded with relatively small increases in the overall cross-sectional dimensions of the feeder house or at least of the linear or straight line conveying portion of it. However, such substantial increases in capacity means that ever larger masses of crop material must be transferred from the gatherer to the feeder house. Neither Ashton et al or Wilson et al recognize the opportunities for improvements in material handling efficiency present at the junction between gatherer and feeder house.

SUMMARY OF THE INVENTION

Accordingly, it is an object of the present invention to provide an improved material handling and forwarding system for transferring crop material from the gatherer to the crop processing system of a mobile harvester. It is a particular object to provide material control and conveying elements such that convergence and concentration of crop material initiated in the gatherer continues while the material is being transferred to the processing unit so that the flow of crop material, when delivered to the processing unit, is in a narrower stream and more concentrated than when it leaves the gatherer.

It is an advantage of the invention that by progressively converging and concentrating the flow of crop material during transfer that the change of direction of material as it leaves the gatherer and enters the transfer stage is less abrupt than the typically 90 degree change of direction of conventional systems. In addition, an inlet to the transfer stage or feeder house much larger than the relatively smaller outlet required to match the separator inlet can be provided, facilitating the entry of material which is typically loose and diffuse and randomly oriented at this point. Thus, flow of material is smoother with a consequent reduction in power consumption and likelihood of blockages.

A transfer system, according to the invention, may include one or more rotatable conveyor elements, transverse to the direction of material flow in the transfer system and carrying material control elements for engaging particles of crop material and propelling them downstream as well as inwardly, tending to narrow or converge the stream of crop material. The rotatable elements or beaters may be carried in a feeder housing which provides controlling, guiding or conveying surfaces, adjacent the rotatable elements, such as a conveying floor beneath an element, for cooperating with the rotatable elements to achieve the desired material movement. Preferably, the flow paths of given particles of crop material result from slippage or relative motion between the material and particular material control elements on the rotatable conveying element as it rotates. Such a result may be obtained with suitable helically disposed surfaces defining an approximately cylindrical periphery of a rotatable transversely disposed conveying element operating closely above a conveying floor and creating a "pinch point" contributing to positive conveying control.

In a transfer system, according to the invention, a plurality of rotatable conveying elements or beaters may be arranged in tandem fashion and the first element of such a plurality may be defined by the central portion, opposite a feeder housing inlet, of the converging member of a gatherer, such as, for example, the platform auger of a grain harvesting platform. And the floor and rear wall of such a platform may be contiguous with and considered as at least a portion of a feeder housing. One or more of the elements may be floatingly supported to accommodate variations in material flow rate. With respect to the direction of material flow, successive beaters may be driven at progressively higher speeds (rotational or peripheral) so as to avoid back feeding. Where a plurality of beaters are used, two adjacent beaters may be of equal length, contributing to efficiency in operation and/or economy of manufacture.

It is a feature of the invention that conveying elements having a combined forwarding and converging function may be used in conjunction with a downstream conveyor portion designed to move material in an essentially parallel flow without convergence. For example, a second or a final conveyor stage may include a side-by-side, dual auger arrangement delivering rearwardly and upwardly to a separator preceded by a first stage including one or more rotatable converging beaters, at least one being wider than the dual auger conveyor. These beaters may be arranged to advance and converge material received from the gatherer rearwardly and upwardly over a sloping floor, off-set forwardly and above a floor of the auger conveyor. Preferably, a beater element is disposed above and at least partially overlaps the lower end of the auger conveyor for delivering crop material directly downwardly and rearwardly into engagement by the augers of the auger conveyor. In some conditions, an elongated stripper partially wrapping the rearmost beater element and extending rearwardly and upwardly, closely spaced from each auger, may be used to improve the efficiency of transfer from the converging beater to the parallel flow dual auger conveyor.

The transfer system just described may be characterized as having first and second, respectively converging and parallel flow stages. Particularly, when a high capacity relatively narrow parallel flow second stage conveyor is used, such as a dual auger arrangement, it is advantageous for transverse beater-like elements of the first stage to carry material control and converging elements spanning the length of the beater and arranged to converge material towards the longitudinal center line of the transfer conveyor system. In such a system, the first stage is wider than the second, but each may be carried in housing portions which are parallel sided with ramp-like transitional housing surfaces extending between the two stages to assist in completing the convergence of crop material into the parallel flow conveyor stage.

DESCRIPTION OF THE PREFERRED EMBODIMENT

The invention is embodied in a header 10 forming part of a self-propelled combine harvester which includes a generally conventional separator body 12 supported above the ground on a pair of forward drive wheels 14 and rear wheels (not shown) and including a grain tank 16 and an operator's station 18 forward of it. A separator 20 of the fore-and-aft axial or helical flow type is approximately centrally mounted and fore-and-aft disposed in the separator body 12. It includes a partially foraminous casing 22 surrounding a separator rotor 24, the casing 22 having a forwardly and downwardly directed inlet 26 at least partially defined by a transition housing portion 28 for admitting crop material, undershot fashion, to a forward portion of the separator rotor 24.

Figure 1:
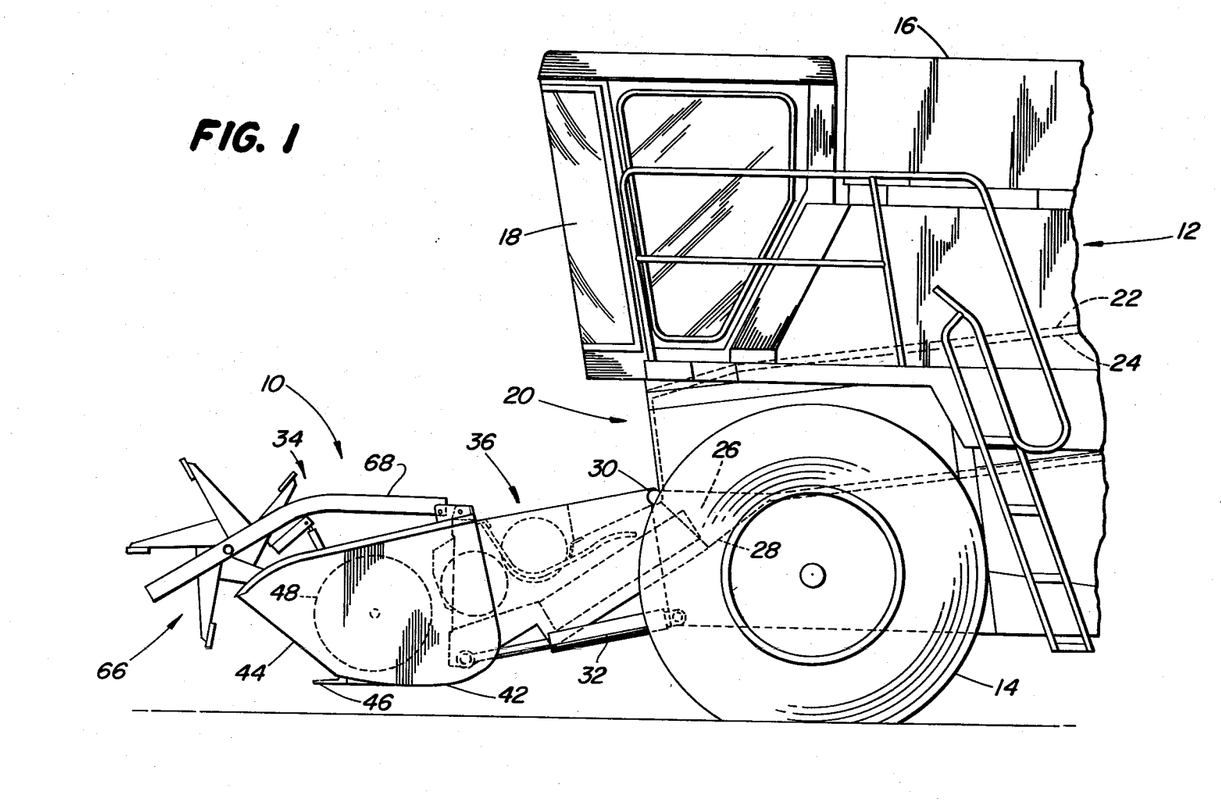
FIG. 1 is a left side elevation of the forward portion of a self-propelled combine carrying a forward mounted grain harvesting header embodying the invention.

The header 10 is carried immediately forward of the separator 20 and pivotally mounted for vertical adjustment, pivoting about pivot axis 30 responsive to a pair of conventional hydraulic cylinders 32 extending between the separator body 12 and the header 10 and hydraulic controls (not shown). The header includes, rigidly coupled together a forward gatherer portion such as the conventional grain platform 34 (seen best in FIG. 1) and, between the gatherer 34 and the separator 20, a feeding portion, the feeder house 36 shown in FIG. 1.

Much of the structure described here is symmetrical about a longitudinal vertical central plane bisecting the harvester and in many cases a common reference numeral has been used for the members of an "equal and opposite", left and right hand pair and, in a given figure, the reference numeral may appear on only one member of the pair. However it will become apparent that the invention is not limited to symmetrical structure.

The gatherer 34 includes a transversely elongated basket or bucket-like housing structure serving as a structural frame for supporting the components of the gatherer unit as well as itself providing some functional surfaces including a generally upright rear wall 40, a floor 42, opposite end sheets 44, and a conventional reciprocating cutter bar 46 supported at the forward edge of the floor 42. A platform auger 48 spans the entire platform 34 and is journaled at its opposite ends in the end sheets 44. The structure of the platform auger 48 (seen best in FIG. 4) is conventional and includes a central, cylindrical core tube 50 carrying equal and opposite left and right-hand lengths of helical flighting 52 and 54, respectively, both extending from adjacent and end sheet 44 but terminating so as to leave a central portion 56 of the auger tube 50 without flighting. As is conventional, the central portion 56 of the auger tube carries an arrangement of staggered feeding fingers 58 which, through an internal crank arrangement (not shown), reciprocate radially with respect to the auger tube central portion 56 as the auger 48 rotates. The rear wall 40 of the gatherer 34 has a central approximately rectangular opening 60 for receiving the feeder house 36, the lateral and vertical extent respectively of the opening 60 being indicated approximately by the numerals 60' and 60" in FIGS. 4 and 3 respectively. Left and right-hand auger strippers 62 and 64 parallel to the platform auger and about on a level with its axis are fixed to the forward side of the rear wall 40, each stripper extending from adjacent and end sheet 44 to terminate close to the rear wall opening 60. The usual, rotatable reel 66 (FIG. 1), adjustably carried on reel arms 68, is provided to assist in controlling crop material flow onto the cutter bar 46 and into engagement with the platform auger 48.

Figure 2:
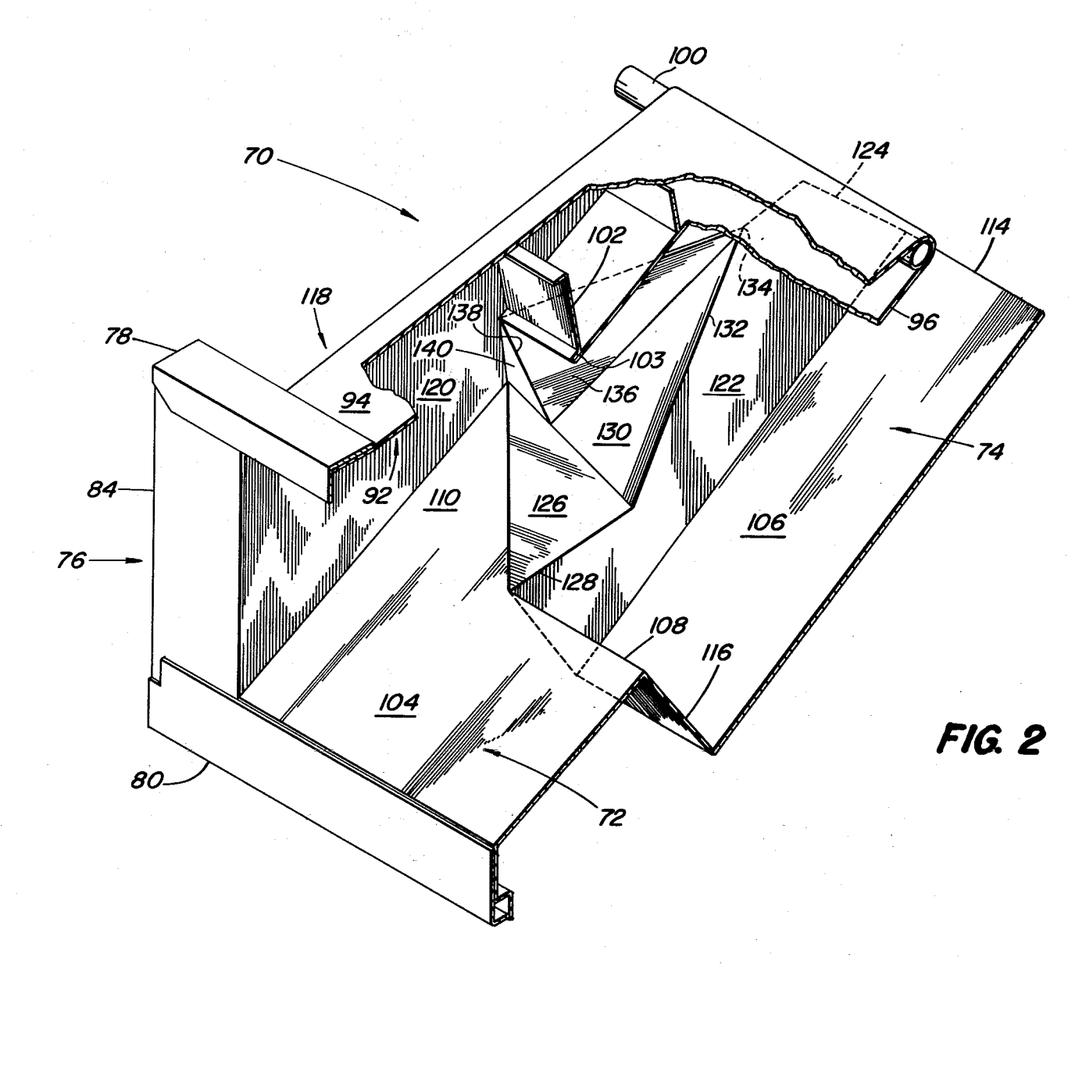
FIG. 2 is an enlarged left-front, three quarter perspective view of the right hand half of the housing of the feeder house of the header, with the left hand half removed and the remainder extensively cut away and simplified to show the internal surfaces of the housing.

A feeder housing 70 constructed largely of sheet metal provides frame and support for internal components of the feeder house 36 as well as providing the internal surfaces contributing to the guiding and controlling of material flow. The housing 70 as a whole (see particularly FIG. 2), defines a generally rearwardly and upwardly sloping feeding passage for the transfer of crop material from the gatherer 34 to the separator 20. The passageway includes a broad first conveyor portion 72 and, connecting with it but off-set downwardly and rearwardly, a narrower second conveyor portion 74.

An upright, transversely extending, front bulkhead 76 of the housing 70 includes top and bottom rails 78 and 80 respectively and left and right-hand bulkhead portions 82 and 84 respectively extending between them. Provision for rigid attachment of the gatherer 34 to the feeder house 36 is conventional and includes the fittings 86 indicated in FIGS. 3 and 5. When attached, the bulkhead 76 registers with the opening 60 of the rear wall 40 of the gatherer. The left and right-hand bulkhead portions 82 and 84 each carry a short length of auger stripper 88 of approximately the same form as and aligned with and effectively extending the left and right-hand stripper portions 62 and 64 carried by the rear wall 40 of the gatherer 34. Spanning and partially shrouding the opening of the first conveyor passageway portion 72 defined by the top and bottom rails 78 and 80 and the opposite bulkhead portions 82 and 84, is a conventional feeder house entry shroud 90.

A generally rectangular top sheet 92 of the feeder housing 70 extends rearwardly and upwardly from the top rail 78 and includes a forward portion 94 forming an upper wall for the first conveyor passageway 72. Spaced downwardly from and underlying the rearward portion of the top sheet 92 is a sheet 96 forming an upper wall for the second conveyor passage portion 74. The transverse rearward edge 98 of this top wall 96, as well as the rearward edge 99 of the top sheet 92, are, as seen best in FIG. 3, structurally connected to a transverse tubular frame member 100, extending laterally somewhat beyond the top sheet 92 and facilitating the pivotal connection of the header 10 to the separator body 12. A generally upright top intermediate bulkhead 102 spans an upper portion of the first conveyor passage 72 adjacent its downstream end and extends from the top wall portion 94 downwards to the forward edge 103 of the second conveyor top wall 96.

The first and second conveyor passages 72 and 74 are further defined by rearwardly and upwardly sloping floors 104 and 106, respectively. A central portion of the first conveyor floor 104 extends in a transverse rear edge 108 but the floor also includes opposite, generally similar, left and right-hand triangular extensions 110. The second conveyor floor 106 terminates in a transverse rear edge 114, and a transversely extending auger conveyor mounting bulkhead 116 extends downwards from the first conveyor floor rear edge 108 to the forward end of the second conveyor floor 106.

Opposite, upright, fore-and-aft extending tapered outer side sheets 118 extend from the front bulkhead 76 to the transverse structural member 100, each including a forward portion 120, forming a side wall of the first conveyor passage 72. Opposite upright inner side sheets 122 form side walls of the second conveyor passage or auger housing 74, each ending in a rear edge 124.

Figure 3:
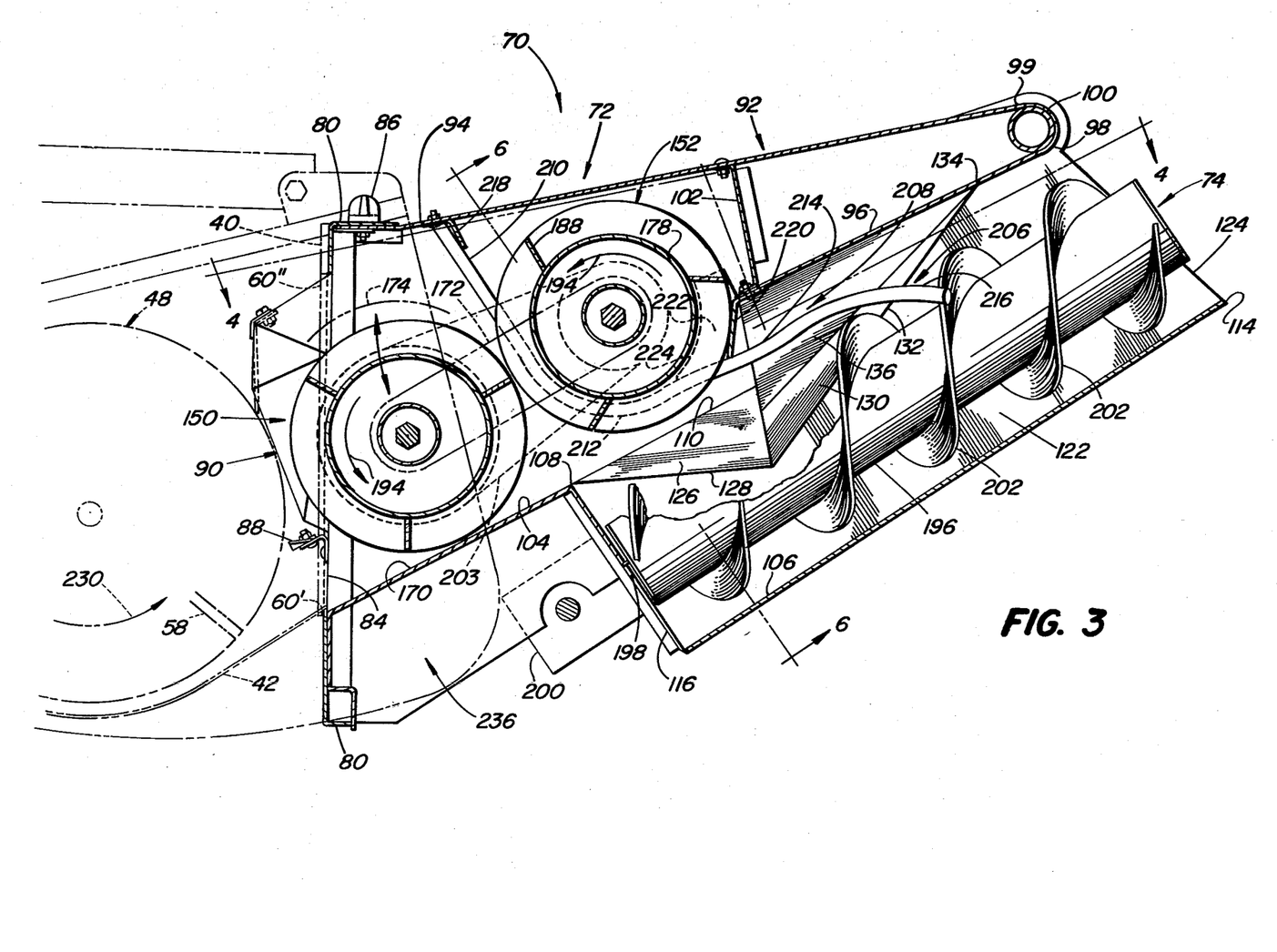
FIG. 3 is a somewhat schematic vertical longitudinal cross-sectional view of the feeder house taken approximately on line 3—3 of FIG. 4.
Figure 4:
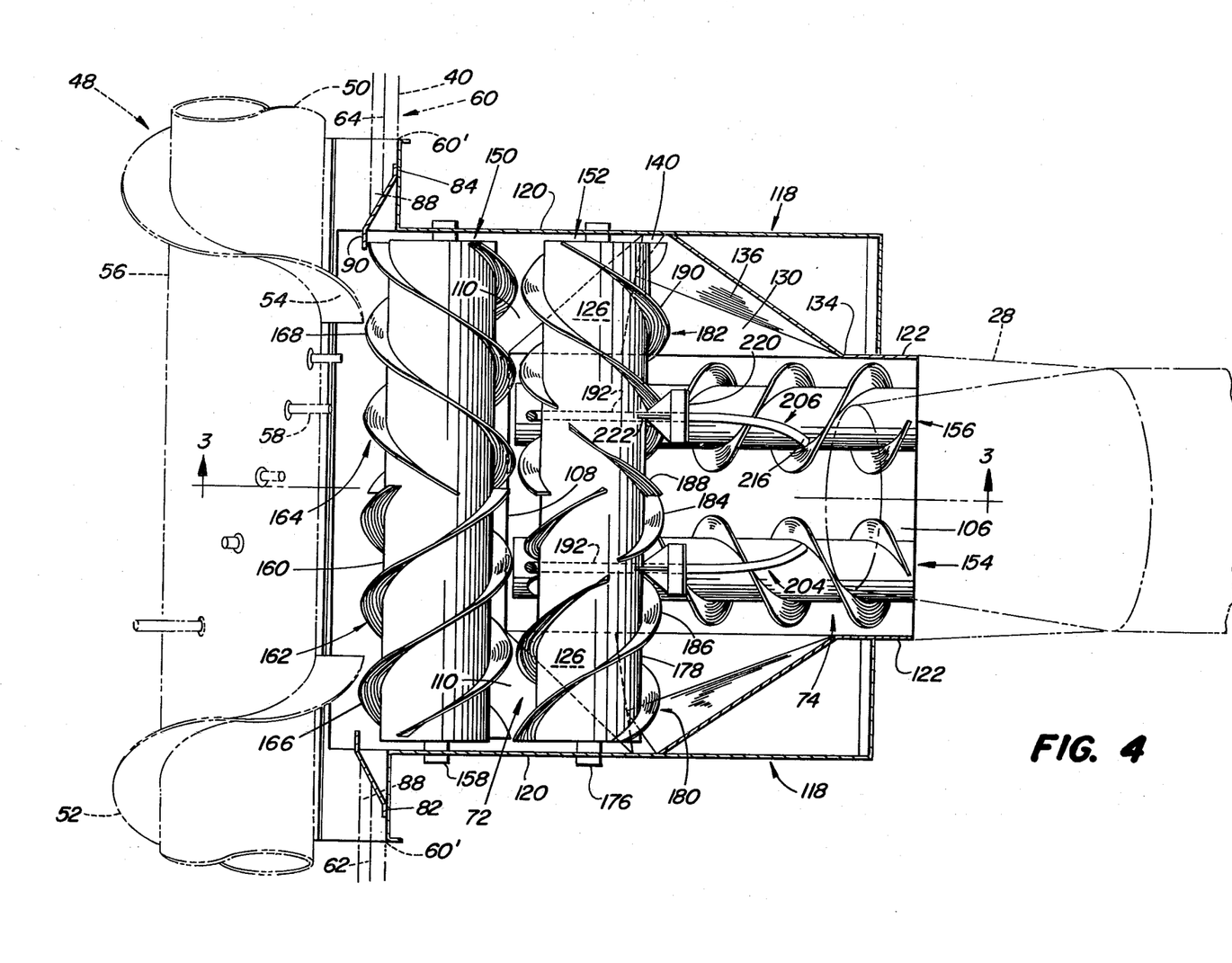
FIG. 4 is a somewhat schematic overhead sectional view taken approximately on line 4—4 of FIG. 3 and particularly showing the converging relationship of the conveying elements involved in transferring crop material from the grain platform to the separator.

The first and second conveyor passages 72 and 74, respectively, are of generally rectangular cross-section, but as best seen in FIGS. 3 and 4, the second passage 74 is much narrower than the first passage 72 and is also off-set downwardly from it. Consequently, transition surfaces facilitating the flow of material from the first to the second passage are provided (see particularly FIG. 2). These include opposite first transition ramps 126 each having an edge contiguous with an edge of one of the opposite first conveyor floor extensions 110 and sloping downwardly and inwardly to meet a first upper edge 128 of a second conveyor side wall 122; opposite second transition ramps 130 each sloping generally inwards but also inclined upwardly in relation to the second conveyor floor 106 and having one edge contiguous with a second upper edge 132 of the second conveyor side wall 122 with a rearward vertex meeting the second conveyor top wall 96 at a point of convergency 134 somewhat ahead of the rearward edge 98 of the top wall 96; and opposite upper triangular transition ramps 136, each contiguous along a lower edge with the second ramp 130 and sloping outwards to an upper edge contiguous with the second conveyor top wall 96 and converging inwards to a forward vertex in the top wall 96 at the common intersecting point 134. The forward edge 138 of the upper transition ramp 136 extends downwardly and inwardly from the first conveyor side wall 120 to meet an intermediate point of the forward edge of the first transition ramp 126. A small, generally upright transition filler 140 is provided to bridge the triangular space so generated. The structure of the feeder housing 70 is completed by other members such as reinforcing gussets external to the first and second conveyor passages 72 and 74, but these are not essential to the invention and need not be discussed here.

The movable or powered conveyor elements within the first and second conveyor passages include, in the first passage 72, front and rear transversely-oriented helicoid beaters 150 and 152, respectively, and in the second passage 74, a pair of side-by-side longitudinally disposed auger conveyors, left and right-hand 154 and 156, respectively. A central shaft 158 of the front beater 150 extends through and is journaled in, at its opposite ends, the opposite side walls 120 by suitable bearing means (not shown). A beater core or drum 160 rigidly attached to and concentric with the shaft 158 substantially spans the space between the opposite side walls 120 and carries on its surface equal but opposite left-hand and right-hand sets of helical flighting 162 and 164, respectively. Each set of flighting consists of three equally spaced helical flighting elements 166 and 168, respectively, each element extending from an extremity of the drum 160 to just beyond the mid point of the drum so that the left and right-hand sets of flighting 162 and 164 overlap slightly. As can be seen in FIG. 3, the front beater 150 is disposed so that the peripheries of the sets of flighting 162 and 164 are closely spaced from the first conveyor floor 104 so as to define a "pinch point"

170. In an alternative arrangement indicated only in phantom in FIG. 3, the front beater 150 may be journaled in the forward ends of a pair of opposite support arms 172 pivoted at their rearward ends to the feeder housing 70 so that the front beater 150 may float in response to variations in the flow of crop material through the pinch point 170 and may assume a raised position as exemplified at 174 in FIG. 3. Downward pressure of the front beater 150 on crop material being conveyed under it may be maintained by relying on the weight of the beater itself or the float arms 172 may be spring loaded (not shown).

The general construction, support and dimensions of the rear beater 152 are similar to those of the front beater 150, the beater including a shaft 176, a core or drum 178, sets of somewhat overlapping helical flighting, left-hand and right-hand 180 and 182, respectively. However, the rear beater 152 differs in that each set 180, 182 of flighting includes inner and outer portions 184, 186, and 188, 190, respectively. These sets of elements are axially spaced so as to define a pair of beater stripper clearance grooves 192, equally spaced from the mid-point of the rear beater 152. In addition, the flighting elements 184, 186, and 188, 190 are formed so that, as indicated in FIG. 3, each is inclined backwards in relation to the direction of rotation of the beaters indicated by the arrows 194.

The left and right-hand auger assemblies 154, 156 are similar but of opposite hand and only one, for example the right hand 156, need be described. A central core 196 is carried concentrically on a shaft 198 which extends through the auger bearing bulkhead 116 and is rotatably supported in an auger drive gear box 200, indicated only in outline in FIG. 3. A pair of equal helical flighting elements 202 are timed 180 degrees apart on the core 196 and extend the full length of the core from closely adjacent the bulkhead 116.

Power input to auger gear box 200 and drives to other components of the feeding system are conventional and not shown except that a chain drive connected between the equal diameter beaters 150, 152 is shown in phantom outline only at 203 in FIG. 3. As indicated, the drive ratio is such that the peripheral speed of the rear beater 152 is greater than that of the front beater 150.

A pair of assemblies referred to here as strippers, left and right-hand, 204 and 206 respectively, are optionally provided to facilitate the flow of material between the first and second conveyor passages 72 and 74 and are shown in the drawings. These assemblies are similar but of opposite hand and only the right hand 206 will be described. The main functional portion is included in a rod 208 which includes a dependent portion 210 extending downward and somewhat ahead of the rear beater 152, a wrapping portion 212, partially wrapping the core 178 of the rear beater within the groove 192 defined by the interruption in the helical flighting, a hold-down portion extending longitudinally and closely above and converging somewhat upon the periphery of the right-hand auger assembly 156 and, finally, a tail portion 216 curving inwards and downwards so as to maintain a close spacing from the periphery of the auger flighting. The stripper assemblies 204 and 206 are each supported by an upper bracket 218 attached to the top wall 94 of the first conveyor passage 72 and a rear bracket 220 attached to the lower edge of the top intermediate bulkhead 102. Each stripper assembly 204, 206 also includes a fin 222, also registering with the grooves 192 defined by the gaps in the flighting of the beater and having a forward fin edge 224, approximately concentric with and closely spaced from the beater drum 178 and wrapping approximately the lower rear quarter of the drum.

In operation, as the combine advances over a field of standing crop such as small grain, crop material is severed by the cutter bar 46 and passes rearwardly over the platform floor 42 to be engaged by the platform auger 48. The auger rotating in the direction indicated by the arrow 230 in FIG. 3 begins the inward convergence of material, the strippers 62 and 64 and finally the strippers 88 cooperating with the auger 48 to direct the crop material in converging streams from the opposite sides of the machine towards the relatively broad feeder house inlet defined in lateral extent by the inner edges of the feeder house front bulkhead 76 upright portions 82 and 84. As seen best in FIG. 4, the helical flighting portions 52 and 54 of the platform auger 48 extend slightly beyond these edges so that the crop material is conveyed positively to the feeder house opening. Material passing rearwardly over the center portion of the floor 42 and any other material spilling inwards from the outer portions of the platform will be engaged by the fingers 58, radially and reciprocatingly extending from the central portion 56 of the platform auger tube 50 to be directed rearwardly and upwardly over the platform floor 42 towards the pinch point 170 between the forward beater 150 and the first conveyor floor 104. The feeding action of a drum with retractable fingers, such as the fingers 58 shown here, is well known, the action being arranged so that the fingers retract at the appropriate time so that the material is discharged rearwardly rather than carried up and over the auger tube center portion 56.

As can be seen from FIG. 3 the forward beater 150 is mounted well forward in the feeder housing 70 so that its periphery actually penetrates the feeder house front bulkhead 76, partially shielded by the shroud 90, and closely approaches the periphery of the platform auger 48 so that incoming material is engaged by the beater 150 as soon as possible after its release by the auger 48.

Figure 7:
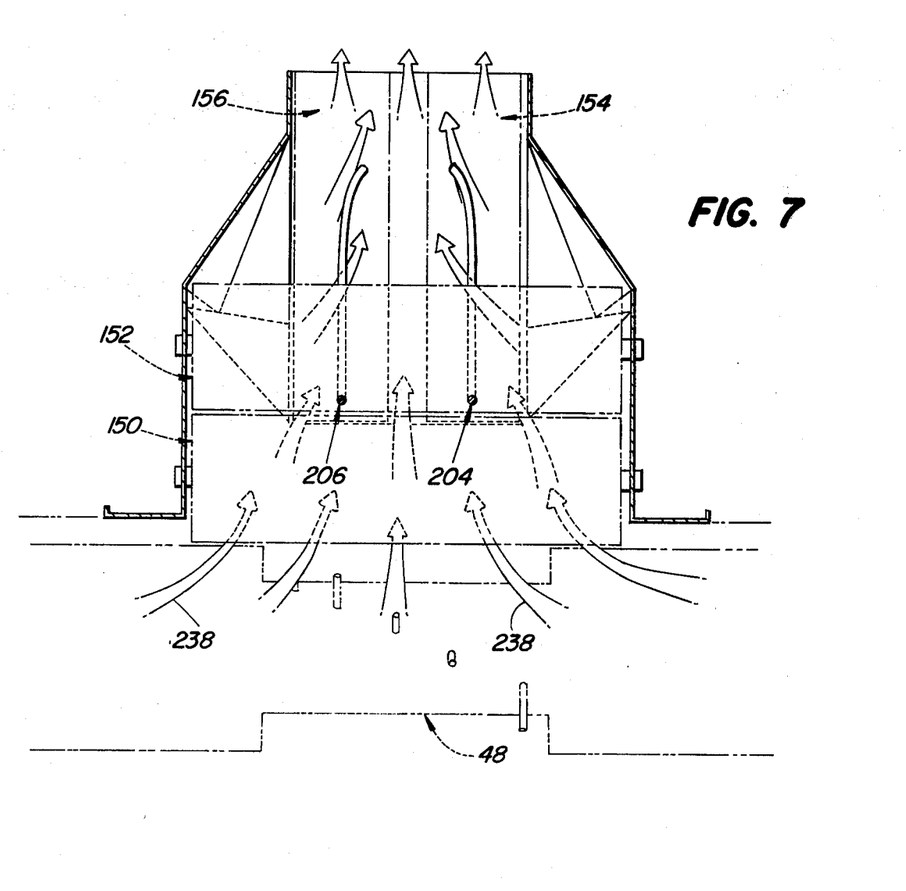
FIG. 7 is a diagrammatic overhead view of the feeder house indicating the general directions of material movement.

The first conveyor floor 104 extends the full width of the housing 70, and is closely spaced from and below the first beater 150 so that there is a "pinch point" extending the full length of the beater, assisting the beater in advancing crop material positively but with a controlled slipping action. Because of friction of the floor 104 and inertia of the crop material itself, the material engaged and advanced by the helical flighting of the beater is not accelerated to the peripheral speed of the beater and there is slippage or relative motion between the crop material and the flighting, which of course deflects material inwards towards the center of the conveyor passage 72. The use of helical members on the first beater 150 give it a pulling or suction action so that at the feeder house inlet material moves in a relatively gently curved path as indicated by arrows 238 in FIG. 7. A beater with helical flighting functions more smoothly and with less input torque variation or torque peaks than a conventional beater with longitudinal paddles in a similar environment. With helical flighting arranged as in the present invention there is, in effect, a continuous action of beater flighting elements approaching and passing through the pinch point 170 and propelling material rearwardly. In contrast, the longitudinal paddles of a conventional beater approach and urge material through the pinch point intermittently, inevitably causing relatively high peaks in the torque required to drive the beater. If the beater 150 is mounted so that it may float, as described above, its action is potentially even smoother in that for example, it can float upwards, restrained by its weight or spring loading, to accommodate a sudden increase in flow of material.

As indicated in FIG. 3, the beaters 150 and 152 are preferably closely spaced so that the second beater 152 may act as a stripper for the first beater 150 if necessary.

By virtue of its helical flighting the second beater 152 continues the converging action of the first, assisted in part by the material control interaction between the floor extensions 110 at the opposite ends of the beater 152, similar to the interaction between the main portion of the floor 104 and the first beater 150 described above. However, an important function of the second beater 152 is to direct crop material downwards into engagement with the dual longitudinal augers 154 and 156 of the second conveyor passage 74. To achieve this the second beater 152 is located somewhat rearward of the floor edge 108 and directly above and open to the foot of the augers 154 and 156, although, of course it extends laterally on both sides considerably beyond the second conveyor passage 74. The backward inclination (relative to beater rotation) of the flighting portions 184, 186, 188 and 190 tends to limit the period of engagement by the second beater of crop material received from the first beater so that it is shed easily, quickly and generally downwardly towards the augers 154 and 156. Additional means for stripping the rear beater are generally not required. Crop material at the extremities of the second beater 152, passing through the pinch points between the floor extensions 110 and beater, receives a relatively strong inward deflection and the converging movement of material in this area generally is assisted by the combined ramp-like effect on each side of the feeder housing 72, of the transition ramps 126, 136 and 130 respectively. These ramps assist in completing the convergence of material not effected directly by the beaters. The relatively downwardly and inwardly sloping ramps 126 below the ends of the second beater provide a relief space for material to drop away from the ends of the second beater and, impelled by the helical flighting of the beater and guided by the transition ramps 130 and 136, converge towards the dual auger conveyors 154 and 156.

Figure 5:
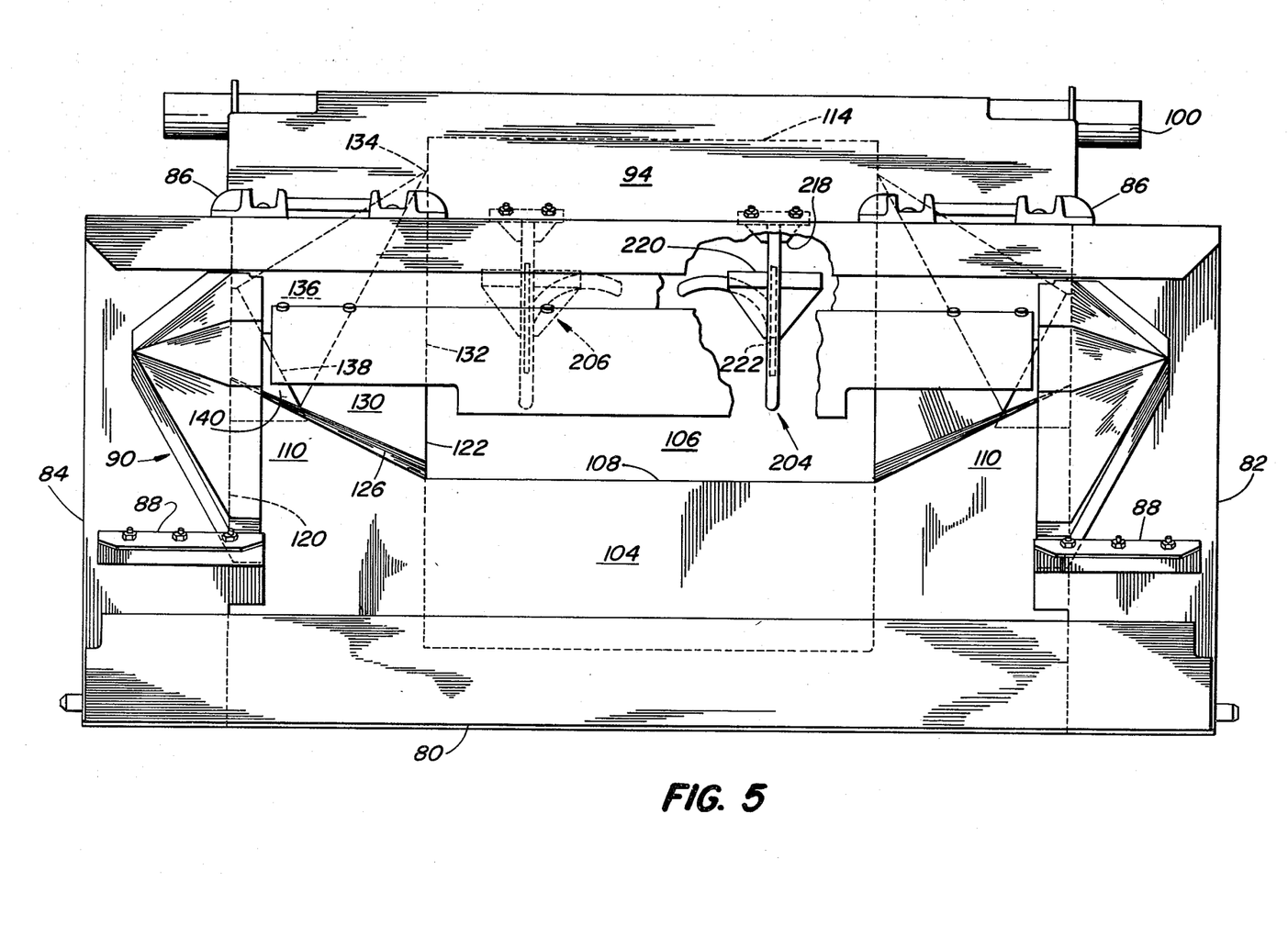
FIG. 5 is an enlarged front view of the feeder house with the grain platform or gatherer removed.
Figure 6:
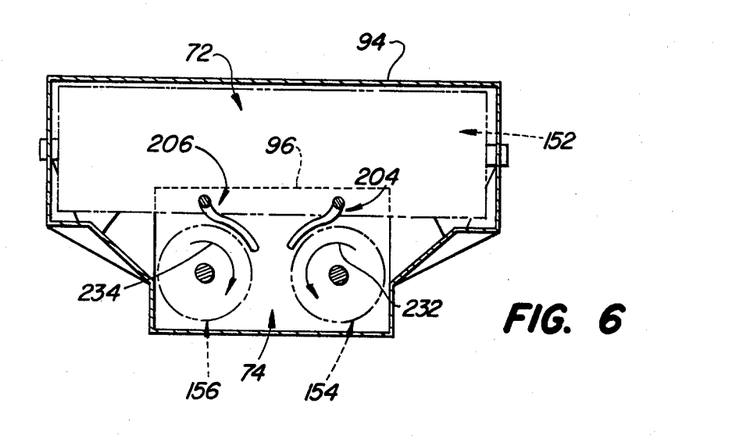
FIG. 6 is a diagrammatic cross-section of the feeder house, approximately on line 6—6 of FIG. 3, showing the relative proportions and dispositions of the first and second conveyor passages.

As indicated in the above description and particularly by FIGS. 3 and 4, the transfer of crop material from the first to second stages of the feeder conveyor, that is from the first conveyor passage 72 to the second conveyor passage 74, is spread over a transition portion of some length so as to be smooth and efficient. The direction of rotation of the conveyor augers 154 and 156 indicated by arrows 232 and 234 in FIG. 5 is such as to assist in completing the convergence of material, so that beyond the downstream end 134 of the transition ramps where all the crop material is closely confined in the rectangular cross section portion of the conveyor passage 74 defined by the floor 106, top 96 and opposite sidewalls 122, material flow is substantially longitudinal and linear and parallel to the confining surfaces. Top wall 96 preferably converges towards the floor 106 to progressively increase the degree of positive control of the material by the augers 154 and 156 so that material is delivered to the separator rotor in a high velocity stream. The operation of a dual auger conveyor of this general type in feeding material in a combine harvester is more fully described in U.S. Pat. No. 4,087,953 Wilson et al which shares a common assignee with the present invention.

The optional strippers 204 and 206 assist in material control in certain crop material conditions (such as light and fluffy) in which material movement behind and somewhat below the rear beater 152 tends to be "lazy" and hesitating and even exhibit a tendency for backfeeding (upwards and forwards over the beater). In these conditions, continuous control and holding down of the crop material and guiding it into engagement with and controlling the augers 154 and 156 is necessary to achieve a smooth feeding of material rather than a fluctuating or slugging effect. The hold down portion 214 and tail portion 216 of the right-hand stripper assembly 206 particularly achieve this function (the left-hand stripper assembly 204 functions in the same way of course) and the stripper assembly as a whole helps to ensure positive stripping of crop material from the second beater 152. The dependent and wrapper portions, 210 and 212 respectively, are as shown in FIG. 3, recessed below the periphery of the beater 152 in the flighting gaps or grooves 192 in part at least so as to maintain as far as possible a "live" beater surface so as not to interfere with its conveying and converging effect. Crop material which may "hairpin" around these forward portions of the stripper assembly rod 208 are removed by a wiping action of the helical flighting edges closely past the opposite lateral surfaces of the fin or blade 222, supported by the rod 208, in the groove 192, in approximately the rear lower quadrant of the beater 152.

In the embodiment described above, the proportions of the gatherer 34 and particularly its rear opening 60 and hence the inlet to the first conveyor passage 72 of the feeder housing 70, may be conventional (in relation to a given harvesting rate capacity). However, the width of the delivery end of a high capacity feeder house desirable for a direct feeding of a high capacity separator (such as the dual auger feeder house and the axial flow rotary separator of the present embodiment) may be only about half the width of the feeder house inlet. For example, the discharge width of the dual auger feeder house may be approximately 700 milimeters while the effective width of the inlet to the feeder house may be 1,300 milimeters. The material, as delivered to the feeder house inlet by the platform auger 48, is in a loose or diffuse and expanded condition and a feeding arrangement according to the present invention may be used to converge and concentrate the material into a compact moving mat for delivery to a separator.

As for the proportions of the rotating members of the feeding arrangement, a preferred arrangement is for both beaters to be of the same outside diameter (for example 360 mm) but somewhat larger than the conveyor augers (for example 280 mm). With these proportions, a beater lead or helix angle of 30 degrees is preferred (measured between the periphery of the helical flighting and a plane perpendicular to the beater axis). Successful operation has been achieved with rotational speed ranges for the front beater, rear beater, and augers respectively of 250 to 400 rpm, 300 to 500 rpm and 750 to 1,000 rpm. Note that the second beater preferably is driven faster than the first beater (that is with a greater peripheral speed) so as to clear material from the first beater and avoid the possibility of build-up or back feeding between the beaters.

Given that it is desirable for a converging beater to be disposed above the foot of (overlap) the second conveyor portion, then the addition of another beater (corresponding to the first beater 150 described above) not only contributes to a cumulative converging function, but also effectively displaces the second conveyor rearwardly, providing a transverse recess or space such as that indicated at 236 in FIG. 3 for conveniently accommodating the auger drive gear cases 200 and transverse members such as drive shafts above the ground and protected within the confines of the header 10.

We claim:

1. In a mobile harvester including a crop processing means, and a forward mounted harvesting means equipped to gather crop material from a field and convergingly deliver it to a discharge opening of the harvesting means, the combination therewith of an improved means for conveying crop material from the harvesting means to the crop processing means comprising:
   a feeder housing having walls and an inlet registering with the discharge opening of the harvesting means and an outlet having a width significantly less than that of the inlet and communicating with the crop processing means;
   first conveyor means carried by the housing including a portion adjacent the inlet substantially spanning the width of the inlet and operable to engage and discharge rearwardly within the feeder housing over a transverse span substantially greater than that of the housing outlet crop material delivered to the discharge opening of the harvesting means;
   second conveyor means of lateral extent significantly less than that of the first conveyor means carried by the housing downstream of and in a crop-receiving relationship with the first conveyor means and including a portion adjacent the outlet substantially spanning the outlet, for receiving crop material from the first conveyor means and operable to move it rearwardly within the housing to the outlet for delivery to the crop processing means; and
   means for driving the conveyor means.

2. The invention defined in claim 1 wherein the feeder housing walls include a pair of laterally spaced, generally upright beater housing walls and a beater housing floor, each of said beater housing walls and floor having a forward portion adjacent the inlet, and a pair of opposite laterally spaced, generally upright conveyor walls and a conveyor floor, each of said conveyor walls and floor having a rearward portion adjacent the outlet and wherein the first conveyor means includes a transversely mounted, rotatable beater extending between and supported by the opposite beater housing walls above the beater housing floor and wherein the second conveyor means is carried above the conveyor floor between the opposite conveyor walls.

3. The invention defined in claim 2 wherein the feeder housing floor portions are rearwardly and upwardly extending, the conveyor floor being off-set generally downwardly and rearwardly from the beater housing floor, and the beater housing floor is disposed closely adjacent the transversely extending beater so as to support crop material for engagement by the beater and advancement rearwardly and upwardly over the beater housing floor and discharge for engagement by the second conveyor means and advancement rearwardly and upwardly over the conveyor floor.

4. The invention defined in claim 3 wherein the beater includes means for imparting a lateral component of motion to the crop material as it is advanced and discharged rearwardly and upwardly.

5. The invention defined in claim 3 wherein the feeder housing further includes a laterally extending conveyor support wall extending between the conveyor and beater housing floors and wherein the second conveyor means comprises a pair of side-by-side conveyor augers, rotatably mounted in the lateral conveyor support wall and extending rearwardly and upwardly, closely spaced from the conveyor floor.

6. The invention defined in claim 3 wherein the first conveyor means includes a second transversely extending beater carried by and extending between the opposite beater housing walls closely adjacent to and rearwardly of the first beater and generally above and in a crop delivery relationship with the second conveyor means and each beater includes a body and at least one raised helically disposed material control element carried by the body.

7. The invention defined in claim 6 wherein the means for driving the conveyor means includes means for driving the second beater at a peripheral speed greater than or equal to that of the first beater.

8. The invention defined in claim 6 wherein the material control element carried by the second beater has, with respect to rotor rotation, a leading face and said face is inclined away from the direction of rotation of the beater.

9. The invention defined in claim 6 wherein the frist and second beaters are of approximately equal length and extend laterally beyond both opposite sides of the second conveyor means.

10. The invention defined in claim 2 wherein the second conveying means includes a pair of generally fore-and-aft extending, side-by-side conveyor augers, extending rearwardly and upwardly and further including means carried by the housing for engaging crop material delivered by the beater towards the augers and guiding it into engagement with the augers.

11. The invention defined in claim 2 wherein the feeder housing walls include ramp portions extending generally between opposite sides of the beater housing floor portion and the respective upper edges of the opposite conveyor walls, the ramp surfaces converging generally inwards with respect to the general direction of conveying of crop material so as to assist in transferring crop material from the first to the second conveyor means.

12. The invention defined in claim 10 wherein the means for guiding material into engagement with the augers includes a pair of elongated strippers, each stripper including a portion partially wrapping and passing below the beater and including a generally fore-and-aft and rearwardly extending portion tangential to the wrapping portion and adjacent an auger.

13. In a header of a mobile crop harvester for removing crop material from a field and delivering it to a separator of the harvester as the harvester advances, and including a transversely elongated gatherer including a rearward outlet to which crop material is delivered by a conveyor of the gatherer, and a feeder house, including a delivery portion, having a housing at least partially surrounding a delivery conveyor for delivering crop material to the separator, an improved receiving portion of the feeder house disposed in a crop material transfer relationship between the gatherer and the delivery portion of the feeder house comprising:
- a feeder housing receiving portion having an inlet communicating with the gatherer outlet and an outlet connected to the feeder housing delivery portion said housing receiving portion having a lateral extent greater than that of the feeder housing delivery portion; and
- receiving conveyor means carried by and substantially spanning the lateral extent of the housing receiving portion operable to engage material delivered to the gatherer outlet and convergingly convey it downstream for reception by the delivery conveyor.

14. The invention defined in claim 13 wherein the receiving conveyor means includes a plurality of spaced transversely disposed conveyor elements including upstream and downstream elements, the upstream element being in a crop-receiving relationship with the gatherer outlet and the downstream element being in a crop delivery relationship with the receiving portion outlet, each transversely disposed element including means for propelling crop material engaged by it diagonally rearwardly.

15. The invention defined in claim 13 wherein the feeder housing receiving portion includes a floor having a downstream edge and the feeder housing delivery portion has a floor having an upstream portion and the downstream edge of the receiving portion floor is offset upwardly from the upstream portion of the delivery portion floor.

16. The invention defined in claim 15 wherein the downstream end of the receiving portion conveyor means overlaps the delivery conveyor.

17. In a mobile crop harvester including a separator and a header including a laterally extending gatherer portion for gathering crop material from a field and delivering it to the separator as the harvester advances, an improved conveying arrangement for the header comprising:
- a feeder housing having a first portion and a second portion downstream of the first portion, each portion having a rearwardly and upwardly sloping conveying floor, each floor having an upstream and downstream portion, the downstream portion of the first conveying floor being connected to the upstream portion of the second conveying floor and the first conveying floor having a lateral extent substantially greater than the second conveyor floor but substantially less than that of the gatherer portion;
- first conveyor means carried at least partially by the first feeder housing portion and operatively associated with and spanning the first conveying floor and including a plurality of transversely disposed rotatable conveyor elements disposed in a fore-and-aft extending array for engaging material gathered into the header and propelling it generally downstream over the first conveying floor and delivering it to the second feeder housing portion; and
- second conveyor means carried by the feeder housing and operatively associated with the second conveying floor for receiving crop material from the first conveyor means and propelling it downstream above the second conveying floor for delivery to the separator.

18. The invention defined in claim 17 wherein the rotatable conveyor elements of the first conveyor means include at least a portion of a platform auger carried by the gatherer portion for receiving gathered crop material and at least one beater in a crop-receiving relationship with and downstream of the platform auger portion.

19. The invention defined in claim 17 wherein the upstream portion of the second conveying floor is offset downwards from the downstream portion of the first conveying floor.

20. The invention defined in claim 19 wherein the first conveyor means includes a rotatable beater reaching downstream of the downstream end of the first conveying floor and a generally longitudinally disposed elongated stripper partially wrapping under the beater and including a rearwardly extending hold-down portion approximately tangential to the beater in a crop material hold-down relationship with and above the second conveyor means.

21. The invention defined in claim 17 wherein the first conveyor means extends downstream beyond the first conveying floor and partially overlaps the second conveyor means.

22. The invention defined in claim 16 wherein the first conveyor means includes at least a portion of a platform auger carried by the gatherer portion and at least two beaters disposed downstream of the auger and the feeder housing second portion includes opposite sidewalls including downstream sidewall portions parallel to each other for cooperating with the second conveyor means to deliver crop material to the separator in a generally longitudinally moving stream.

23. In a combine having conveying elements for conveying crop material from a gathering unit to a processing unit, a two-stage feeder housing wall arrangement at least partially surrounding the conveying elements comprising:
- a first stage housing including opposite generally upright sidewalls, a top wall, and a rearwardly and upwardly sloping floor having a rearward edge, said edge including a laterally extending central portion and, respectively, contiguous with the opposite ends of the central portion, left and right-hand opposite outer edges diverging outwardly and rearwardly;
- a second stage housing substantially narrower than the first having an upwardly and rearwardly sloping floor offset downwardly and rearwardly from the floor of the first stage, opposite generally parallel sidewalls offset inwardly from the walls of the first stage, each of said walls having an upper edge having an upstream end contiguous with the rearward edge of the first stage floor adjacent a junction between the central and an outer portion of said edge;
- a generally rectangular transverse bulkhead having upper and lower edges contiguous respectively with the first stage housing floor rearward edge central portion and a forward portion of the second stage floor, and opposite edges contiguous with the opposite sidewalls of the second stage housing; and,
- on each side of the feeder housing, a triangular transition ramp having a forward base edge at least partially co-extensive with an outer edge of the first stage floor rearward edge and extending downwardly and inwardly relative to the plane of the first floor and an inner edge at least partially coextensive with a sidewall upper edge so as to tend to converge towards the center of the housing crop material being conveyed through the housing and being engaged by the transition ramp.

24. In a combine harvester, a transfer conveyor arrangement for receiving, as the harvester advances over the field, a gathered flow of crop material in a relatively loose condition and delivering it to a separator of the harvester in a relatively narrow stream comprising:
- first and second stage conveyor housing defining respectively generally longitudinally aligned first and second conveyor passages of generally rectangular cross-section sloping rearwardly and upwardly, each having a floor and an upstream inlet and a downstream outlet, the first stage outlet and second stage inlet being in a crop material transferring relationship and the passage of the second stage being substantially narrower than that of the first stage;
- means in the first stage for receiving the gathered flow of crop material and converging it inwardly while conveying it rearwardly towards the outlet of the first stage for transfer to the inlet of the second stage; and
- means in the second stage for engaging crop material from the first stage and conveying it downstream to the outlet of the second stage for delivery to the separator.

25. The invention defined in claim 24 wherein the conveying passage of the second stage is offset downwards from that of the first stage.

26. The invention defined in claim 24 wherein the lateral extent of the first conveyor passage is approximately twice that of the second conveyor passage.

27. The invention defined in claim 24 wherein the outlet of the second stage conveyor housing is connected to the separator and the width of said housing is approximately equal to that of the separator.

28. In a combine harvester including a crop processing means and a forward mounted harvesting means equipped to gather crop material from a field and deliver it to a discharge opening of the harvesting means, the combination therewith of an improved means for conveying crop material from the harvesting means to the crop processing means comprising:
- a feeder housing having walls and an inlet registering with and of similar width to the discharge opening of the harvesting means and an outlet having a width significantly less than that of the inlet, and a plurality of internal passages at least partially defined by the housing walls, said passages successively decreasing in lateral extent between the inlet and the outlet;
- a plurality of conveying elements carried by the housing and at least partially occupying the internal passages and including a first conveying element adjacent the feeder housing inlet and substantially spanning the width of the inlet and operable to engage and discharge rearwardly within the feeder housing from substantially the full span of the first conveying element, crop material delivered to the discharge opening of the harvester means, and a second conveying element, adjacent the outlet, substantially spanning the outlet and operable to move crop material rearwardly within the housing to the outlet for delivery to the crop processing means, and an intermediate conveying element disposed between the first and second conveying elements and operable to receive and transfer crop material from the first conveying element to the second conveying element, at least one of the conveying elements including means for urging crop material diagonally rearwardly; and
- means for driving the conveying elements so that they cooperate with the feeder housing passages to receive a mat of crop material from the harvesting means and progressively reduce its lateral extent for delivery to the crop processing means.

* * * * *

UNITED STATES PATENT AND TRADEMARK OFFICE
CERTIFICATE OF CORRECTION

PATENT NO. : 4,282,703

DATED : August 11, 1981

INVENTOR(S) : John E. Wilson and Edward J. Hengen

It is certified that error appears in the above-identified patent and that said Letters Patent is hereby corrected as shown below:

Column 14, line 25, delete "16" and insert -- 17 --.

Column 15, line 11, delete "housing" and insert -- housings --.

Signed and Sealed this

Second Day of November 1982

[SEAL]

Attest:

GERALD J. MOSSINGHOFF

Attesting Officer     Commissioner of Patents and Trademarks